March 9, 1926.
S. G. VAN DERBECK
WINDSHIELD CLEANER
Filed Nov. 2, 1921
1,576,381
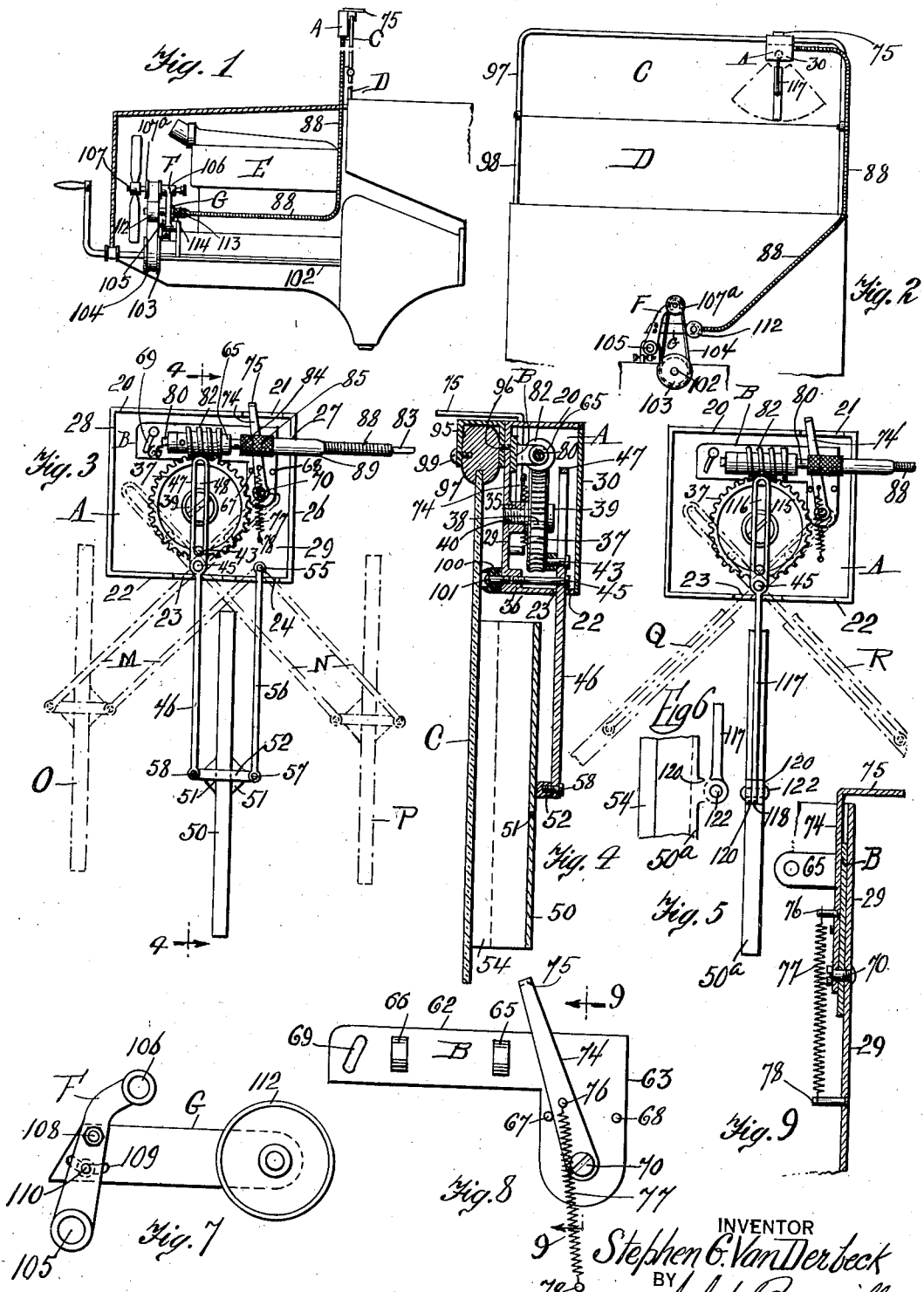

Patented Mar. 9, 1926.

1,576,381

UNITED STATES PATENT OFFICE.

STEPHEN G. VAN DERBECK, OF HACKENSACK, NEW JERSEY.

WINDSHIELD CLEANER.

Application filed November 2, 1921. Serial No. 512,217.

*To all whom it may concern:*

Be it known that I, STEPHEN G. VAN DERBECK, a citizen of the United States, and resident of Hackensack, in the county of Bergen and State of New Jersey, have invented certain new and useful Improvements in a Windshield Cleaner, of which the following is a specification.

This invention relates to a windshield cleaner. Its object is the production of a device which is specially adapted to maintain the windshield of an automobile or of various other vehicles clean while driving.

Another object of the invention is the production of a windshield cleaner which can be maintained in continuous operation, at the will of the operator, to avoid the accumulation of any rain, snow, fog and the like on the windshield while driving the vehicle.

Fig. 1 represents a side view of the windshield cleaner with a fragmentary portion of the automobile, to which it is attached; Fig. 2 shows a front view of the windshield cleaner slightly modified with a fragmentary left hand view of Fig. 1; Fig. 3 shows an enlarged front elevation of the cleaner with an element removed; Fig. 4 is a section of Fig. 3 on the line 4, 4; Fig. 5 indicates a view similar to Fig. 3 with a modification; Fig. 6 indicates a side view of a fragmentary portion of Fig. 5; Figs. 7 and 8 represent elevations of some details and Fig. 9 shows an enlarged section of Fig. 8 on the line 9, 9.

The windshield cleaner is shown with a casing indicated in its entirety by the letter A, and comprises the top wall 20 with the guide opening 21, the bottom wall 22 with the guide openings 23 and 24, the side wall 26 with the opening 27, the side wall 28, the rear wall 29 and the cover plate 30. A central boss 35 and a boss 36 extend up from rear wall 29. A worm wheel is indicated at 37 and is journaled on a journal pin 38 having the slotted head 39 and threaded end 40. The latter is in threaded engagement with the boss 35. A crank pin 43 extends from the outside face of the worm wheel 37. An elongated pivot pin 45 extends from the boss 36 and has pivoted thereon the oscillating lever with the lower member 46, and the upper member 47 with the elongated opening 48. The crank pin 43 extends through the opening 48. A squeegee is shown with the metallic back 50 that has extending therefrom the lugs 51 and to the latter is fastened the yoke 52. A flexible member 54 extends from back 50. A second elongated pivot pin 55 similar to 45 extends from a boss, not shown, formed with the rear wall 29 of the casing A. A lever 56 has one end pivoted on the pivot pin 55 and its other end is pivoted to the yoke 52 by means of the screw pin 57. The lower end of the member 46 is pivoted to the yoke 52 by means of the screw pin 58.

The yoke 52 with its coacting levers constitutes a parallel motion.

An oscillating bracket is indicated in its entirety by the letter B and comprises the plate with the legs 62 and 63.

Journal brackets 65 and 66 extend from the leg 62 and stop pins 67 and 68 extend from the leg 63. A guide opening 69 is formed in the leg 62. A screw pivot 70 extends from the rear wall 29 of the casing A. An operating lever 74 extends through the opening 21 of the wall 20 and is indicated with the extension arm 75. The arm 74 has extending therefrom the pin 76. The lever 74 as well as the leg 63 of the bracket B are pivoted on the screw pivot 70. A spring 77 has one end fastened to the pin 76 and its other end is fastened to a pin 78 extending from the rear wall 29.

A shaft 80 is journaled in the journal brackets 65 and 66 and has fastened thereto a worm 82. A flexible shaft 83 is coupled to the shaft 80 by a coupling with the members 84 and 85. A spiral casing 88 with the sleeve 89 is provided for the flexible shaft 83. The sleeve 89 is connected to the member 85 in the usual manner.

A U shaped bracket 95 is detachably connected to the rear wall 29 of the casing A by means of screws 96.

A wind shield is indicated with the upper glass C and the lower glass D. A frame 97 for the glass C is hinged to the frame 98 of the glass D. The bracket 95 is supported on the top member of the frame 97 and clamped thereto by screws 99. A rubber washer 100 is fastened to the outer face of the rear wall 29 by means of the screw 101.

The engine of the automobile is indicated in its entirety by the letter E. The main shaft 102 of the engine has connected thereto the pulley 103.

A fan bracket F for the engine is pivoted on a pin 105 extending from the frame thereof. A journal bearing 106 in the bracket F supports the fan shaft 107 having fastened thereto the fan pulley 107ª. A belt 104 connects the pulleys 103 and 107ª. A bracket G is hinged to the bracket F by means of a pivot bolt 108.

An opening 109 is indicated in one end of the bracket G. A clamping screw 110 extends through said opening 109 and its threaded end is screwed into the bracket F.

The flexible shaft 83 extends to the bracket G and has fastened thereto the pulley 112. The casing 88 is connected to the bracket G by means of the coupling having the members 113 and 114 in the usual manner.

In Fig. 5 is indicated the casing A with the worm wheel 37, the worm 82, the operating lever 74, the bracket B, the shaft 80, the spiral casing 88 with their appurtenances. An oscillating lever is indicated with the upper member 115 having the elongated opening 116, and the lower member 117 with the eye end 118. The latter oscillating lever is pivoted on the pivot 45 as for the lever with the members 46 and 47. The lever 56 in this modification is omitted. The squeegee is indicated with the metallic back 50ª, which has extending therefrom a pair of journal lugs 120. The eye 118 is hinged to the lugs 120 by means of the pin 122.

To use the windshield cleaner the U shaped bracket 95 is fastened to the top member of the frame 97 of the upper glass C. The bracket G is swung on the pivot bolt 108 to locate the circumferential surface of the pulley 112 in contact with the belt 104 to rotate the flexible shaft 83. When the operating lever 74 is located in the position, best shown in Figs. 3, 4 and 5, the worm 82 is in mesh with the worm wheel 37. The worm 82 is rotated by the flexible shaft 83, and thereby the worm wheel 37 is turned. During the rotations of the worm wheel 37 and referring particularly to Figs. 3 and 4 the oscillating lever with the members 46 and 47 and lever 56, are swung to the positions indicated by the letters M and N and the squeegee is swung to the positions indicated by the letters O and P, by reason of the oscillating lever having the members 46 and 47 swinging on the pivot pin 45, and the lever 56 swinging on the pivot 55. The said squeegee is maintained in positions parallel to each other, and the flexible member 54 of said squeegee bearing on the glass C keeps the portion thereof with which it contacts clear of rain, snow, or any other foreign substance.

Referring to Figs. 5 and 6 the oscillating lever with the members 115 and 117 is caused to swing by the rotations of the worm wheel 37 to take the positions indicated by the letters Q, R, that is to say, the squeegee oscillates on the pivot pin 45 with a pendulum movement, and the portion of the glass C with which the flexible member 54 contacts is kept clean as already described. To stop the movements of the squeegee the operating lever 74 is swung to contact with the pin 68 of the bracket B, and the worm 82 will disengage from the worm wheel 37. The tension of the spring 77 maintains the lever 74 in either of its inclined positions.

Having described my invention what I desire to secure by Letters Patent and claim is:—

1. The combination in a wind shield cleaner, of a casing for the cleaner adapted to be attached to the glass of the windshield of a vehicle, a bracket in the casing pivoted to a wall thereof, a rotating shaft journaled to said bracket, a worm fastened to the shaft, a worm wheel journaled in the casing and in mesh with said worm, means to turn said shaft and thereby the worm, means connected to said bracket to swing it to disengage the worm thereon from said worm wheel, a pivot pin fastened at one end in the casing, an oscillating lever with an upper member and a lower member pivoted to said pin, a crank pin extending from said worm wheel actuating the upper member of said oscillating lever with the rotation of the worm wheel, an element connected to the lower member of said oscillating lever, and a cleaning element adapted to bear on said glass of the windshield connected to said first element, said cleaning element swinging over said glass with the oscillation of said lever resulting from the rotation of said worm wheel.

2. The combination in a windshield cleaner of a movable cleaning element adapted to bear and sweep on the face of a windshield, a casing for the cleaner attached to the glass of the windshield, a bracket with a pair of stop pins pivoted on a pivot extending from a wall of the casing, an operating lever also pivoted on said pivot, said lever when moved to contact with said stop pins swinging said bracket from one side to the other, a rotating shaft journaled to the bracket, a worm fastened to the shaft, a worm wheel journaled in the casing and in mesh with the worm and connections between the worm wheel and the said cleaning element.

Signed at the borough of Manhattan, city of New York, in the county of New York and State of New York, this 1st day of November A. D. 1921.

STEPHEN G. VAN DERBECK.